United States Patent
Iguchi (10) Patent No.: US 7,619,774 B2
(45) Date of Patent: Nov. 17, 2009

(54) IMAGE DATA TRANSFER FROM APPLICATION TO PRINTER DRIVER PROCESS SECTIONS AND PROCESSING FOR SELECTED KIND OF PRINTING

(75) Inventor: Ryosuke Iguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 564 days.

(21) Appl. No.: 11/608,086

(22) Filed: Dec. 7, 2006

(65) Prior Publication Data
US 2007/0146487 A1     Jun. 28, 2007

(30) Foreign Application Priority Data
Dec. 28, 2005    (JP) .............................. 2005-377822

(51) Int. Cl.
- H04N 1/40 (2006.01)
- H04N 1/407 (2006.01)
- G06K 15/02 (2006.01)

(52) U.S. Cl. ...................... 358/1.9; 358/3.01; 358/1.13; 358/1.18

(58) Field of Classification Search .................. 358/1.9, 358/2.1, 3.01, 3.21, 3.24, 3.27, 1.13, 1.18, 358/518, 521, 450, 462
See application file for complete search history.

(56) References Cited

U.S. PATENT DOCUMENTS

| | | | |
|---|---|---|---|
| 5,321,523 A | | 6/1994 | Hashimoto |
| 5,680,226 A | * | 10/1997 | Takayanagi .................. 358/462 |
| 6,954,284 B2 | * | 10/2005 | Enomoto .................... 358/1.18 |
| 7,068,818 B2 | | 6/2006 | Nishio |
| 7,433,064 B2 | * | 10/2008 | Takahashi ................... 358/1.13 |
| 2002/0181000 A1 | | 12/2002 | Fukasawa et al. |

FOREIGN PATENT DOCUMENTS

| | | |
|---|---|---|
| CN | 1459056 A | 11/2003 |
| JP | 01-229636 A | 9/1989 |
| JP | 01-282967 A | 11/1989 |
| JP | 2002-262110 A | 9/2002 |
| JP | 2002-344763 A | 11/2002 |
| JP | 2003-008920 A | 1/2003 |

* cited by examiner

Primary Examiner—Scott A Rogers
(74) Attorney, Agent, or Firm—Canon U.S.A., Inc., IP Division (57) ABSTRACT

In a system including a plurality of process sections capable of image processing, when there is restriction on bit accuracy of a drawing interface of OS between the process sections, process sections where image processing is performed, are switched according to kinds of printing, such as normal printing and sample printing. For example, in normal printing, image processing is performed in the printer driver and in sample printing, image processing is performed in an application.

23 Claims, 7 Drawing Sheets

IMAGE DATA TRANSFER FROM APPLICATION TO PRINTER DRIVER PROCESS SECTIONS AND PROCESSING FOR SELECTED KIND OF PRINTING

BACKGROUND OF THE INVENTION

1. Field of the Invention

The present invention relates to an image processing apparatus and an image processing method, and a computer program and a storage medium for the same apparatus and method.

2. Description of the Related Art

With increase in the availability of digital still cameras, digital video cameras and other digital cameras in recent years, digital display of photo images has become popular. Particularly, opportunities have increased to handle images of photographic tones as digital image data on the personal computer (PC). Moreover, with increase in the availability of ink jet printers, image data can be printed easily.

Further, as application software for correcting or processing images is popularly employed, it has become possible for the users to process images as they desire. For example, a slightly reddish image can be adjusted by adding a cyan as a complementary color for the red. On the other hand, when the subject appears dark, for example, in a backlight image, the image can be made lighter by correcting brightness to obtain an optimum image.

In recent years, the color reproduction of printers has improved, which enables color adjusting with high accuracy. Consequently, it is possible for the user to set parameters (color adjustment parameters) for color adjustment, and finish up a print image in a color tone which the user desires.

However, in some cases, the drawing interface of OS (operating system) has a restriction in bit accuracy. For this reason, according to Japanese Patent Application Laid-Open No. 2002-344763, when an application transfers image data to the printer driver, the bit accuracy of image data processed in the application, is reduced to the bit accuracy of the drawing interface of the OS and the image data is printed with reduced bit accuracy. Even if images are processed with a 16-bit accuracy in an application, image data is converted to a restrictive number of bits (8 bits, for example) of the drawing interface of an OS, and transferred to the printer driver.

To circumvent this restriction on bit accuracy, if the image processing bit number (hereafter referred to as a bit number) of the drawing interface of the OS is smaller than the bit number of the printer driver, image processing for printing which emphasizes gray-scale tone, needs to be performed in the printer driver instead of the application. Particularly in printing which requires a high bit accuracy, such as monochrome printing, it is necessary to perform image processing in the printer driver. If image processing, such as bit conversion and a color process, is performed in the printer driver, it is possible to perform printing which circumvents the restriction on bit accuracy.

On the other hand, in sample printing, because the size of printed images is smaller than the size in normal printing, a high bit accuracy as in normal printing is not required. Therefore, so long as printing does not require a high bit accuracy, images can be processed in either the application or the printer. However, a printer driver is required for each printer and the printer driver is a device-dependent process section. In a system having a plurality of printers, a number of printer drivers increases by the number of printers. Therefore, it is necessary to reduce the capacity of each printer driver as much as possible and limit its functions to a minimum required by the printer (i.e., only functions peculiar to each individual printer).

Meanwhile, a drawing application can be operated irrespective of printer types. Therefore, in contrast to the printer drivers, an application is a device-independent process section. For this reason, an application can possess functions common to different printers. For example, in order to perform sample printing, a layout is created by the application, and data is transferred through the OS to the printer driver. As described above, sample printing does not demand a high bit accuracy. Accordingly, even if the OS restricts the bit accuracy in sample printing, this has no adverse effects on the printing. Therefore, by concentrating the functions common to different printers on an application instead of providing those functions to each printer driver, the capacity of the whole system can be minimized.

As described, it has become necessary to change the image process sections according to kinds of printing, such as normal printing and sample printing.

In conventional image processing, the image process sections are not changed in order to perform image processing in appropriate process sections according to kinds of printing (normal printing and sample printing, for example).

SUMMARY OF THE INVENTION

An embodiment of the present invention is directed to an image processing apparatus which can change process sections so that image processing can be executed in an appropriate process sections according to kinds of printing, such as normal printing and sample printing.

According to an aspect of the present invention, at least one embodiment is directed to an apparatus having a first process section for executing a first image process on image data and a second process section for executing a second image process on image data, wherein the first process section performs the first image process on the image data, image data of bit number s is transferred from the first process section to the second process section, and the second process section performs the second image process of converting the image data of bit number s into image data of bit number n (n is larger than s). The image processing apparatus includes a first process unit configured to cause the first process section to execute the first image process when a first kind of printing is selected, and a second process unit configured to cause the second process section to perform the second image process when a second kind of printing is selected.

According to this aspect of the present invention, the process sections for different image processes can be changed so that image processes can be performed in appropriate process sections according to kinds of printing, such as normal printing and sample printing.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENT

First Exemplary Embodiment

Various exemplary embodiments, features, and aspects of the invention will be described in detail below with reference to the drawings.

Figure 1:
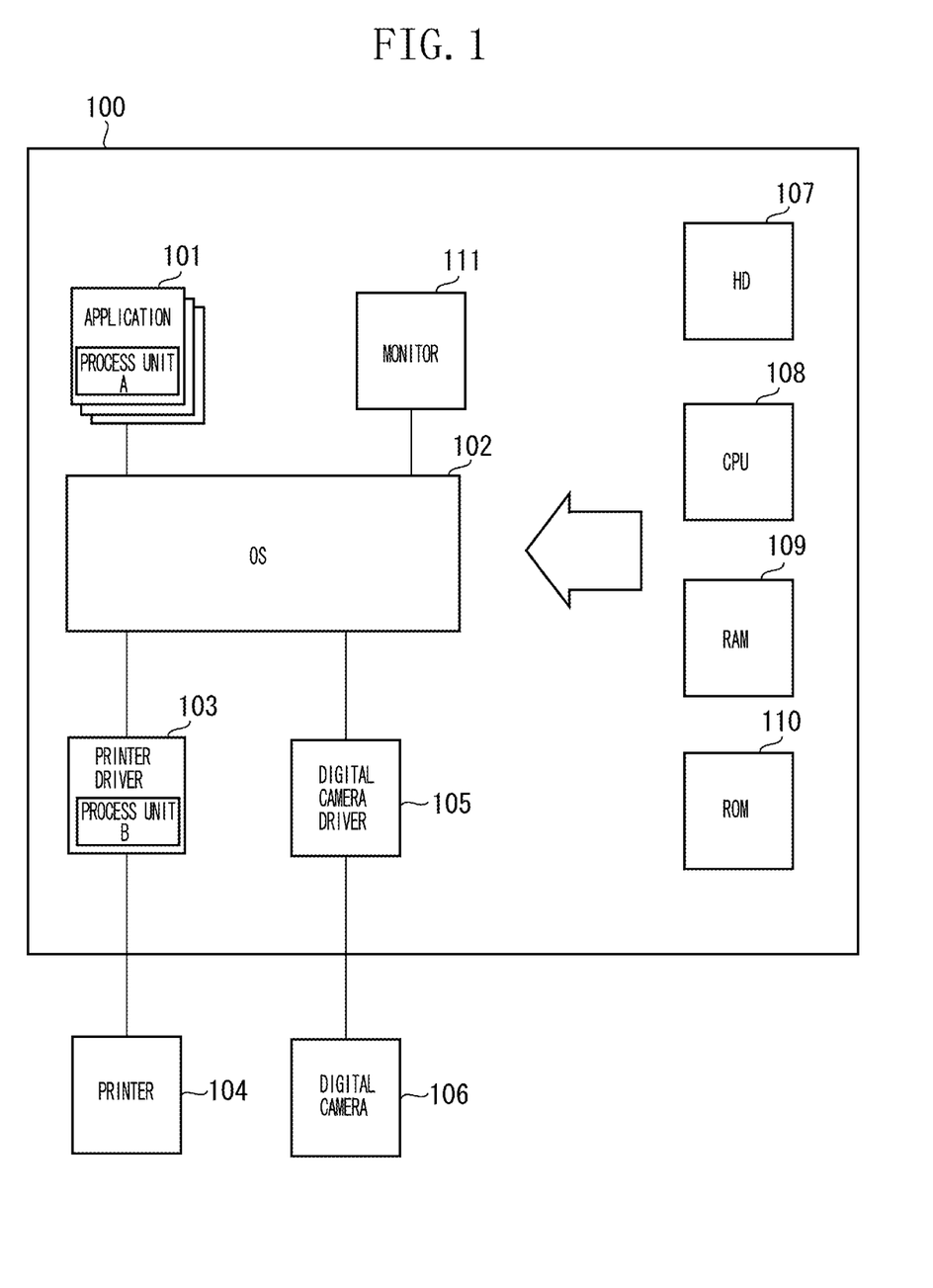
FIG. 1 is a block diagram showing components of an image processing system according to an embodiment of the present invention.

FIG. 1 shows an example of an image processing system according to a first embodiment of the present invention. A host computer 100 is connected to, for example, a printer such as an ink jet printer, and a digital still camera 106. The host computer 100 includes application software 101, such as image processing, word processing, spreadsheet, and an Internet browser, an operating system (OS) 102, and a monitor 111. Moreover, the host computer 100 includes a printer driver 103. The printer driver 103 generates print data by executing various drawing commands (an image draw command, a text draw command, graphics draw command) to represent an output image. The output image is sent to the OS 102 by the application 101. The host computer 100 further includes a digital still camera driver 105 as software to transfer data from the digital still camera 106 to the OS 102.

On the other hand, the host computer 100 includes various items of hardware on which software runs, such as a hard disk drive (HD) 107, a central processing unit (CPU) 108, a random access memory (RAM) 109, and a read only memory (ROM) 110.

As an example of the host computer 100 shown in FIG. 1, an IBM AT-compatible personal computer can be cited which is popular and uses Microsoft Windows® XP OS. In this case, an optional application for printing is installed in the OS, and a digital still camera and a printer are connected to the computer. The embodiments of the invention is described using Windows® XP as OS, but Apple Macintosh® or Linux® can also be used.

In the host computer 100, the application 101 generates output image data using text data classified as text such as characters, graphics data classified as graphics, such as graphic figures, and image data classified as natural pictures and so on. These output image data can be displayed on the monitor 111 by OS 102. When the output image data is printed, the application requests the OS 102 to produce a printed image. Draw commands indicating an output image, which includes a graphics data portion formed by graphics draw commands and the image data portion formed by image draw commands, are sent to the OS 102. In response to the output request from the application, the OS 102 issues draw commands to a printer driver 103 corresponding to the printer which outputs a printed image. The printer driver 103 executes a request to print and the draw commands sent from the OS 102, generates print data that can be printed by the printer 104, and transfers the data to the printer 104.

Though not shown, the OS 102 includes a standard interface (drawing interface) that issues draw commands. When images are transferred between the application 101 and the OS 102, or image data is transferred between the OS 102 and the printer driver 103, images or image data are transferred through this drawing interface.

If the printer 104 is a raster printer, the printer driver 103 sequentially performs an image correction process on draw commands from the OS 102 in the process section B, and sequentially rasterizes all draw commands into an RGB 24-bit page memory. After all the draw commands have been rasterized, the contents of the RGB 24-bit page memory are converted into data in a form printable by the printer 104, such as CYYK data, and transferred to the printer.

The image process in this exemplary embodiment, which is executed by the host computer 100, is suitable in particular for image data obtained by the digital still camera 106. In order to input the thus obtained image data to the personal computer, the image processing apparatus is configured to transmit data from the digital still camera driver 105 to a hard disk drive (HD) 107 in the personal computer.

Image data captured by the digital still camera 106 is generally recorded and stored in an SRAM that is represented by a CF card or a SD card. The user can transfer this data to the hard disk drive 107 in the PC through the digital still camera driver 105. Since the application 101 can start the image processing software, it is possible to adjust color balance and brightness of image in the process section A. In addition, similar processes can be performed in the process section B in the printer driver 103.

In this exemplary embodiment, image processing is carried out on RGB signals. Therefore, when an image entered into the digital still camera driver 105 undergoes an image process executed by the application 101, if the target image is a bit map image or a TIFF image stored in a form of RGB signals, the image can be processed as it is. However, a JPEG image is stored in a form of YCbCr signals, therefore in this exemplary embodiment, YCbCr signals are converted into RGB signals for image processing.

Figure 7:
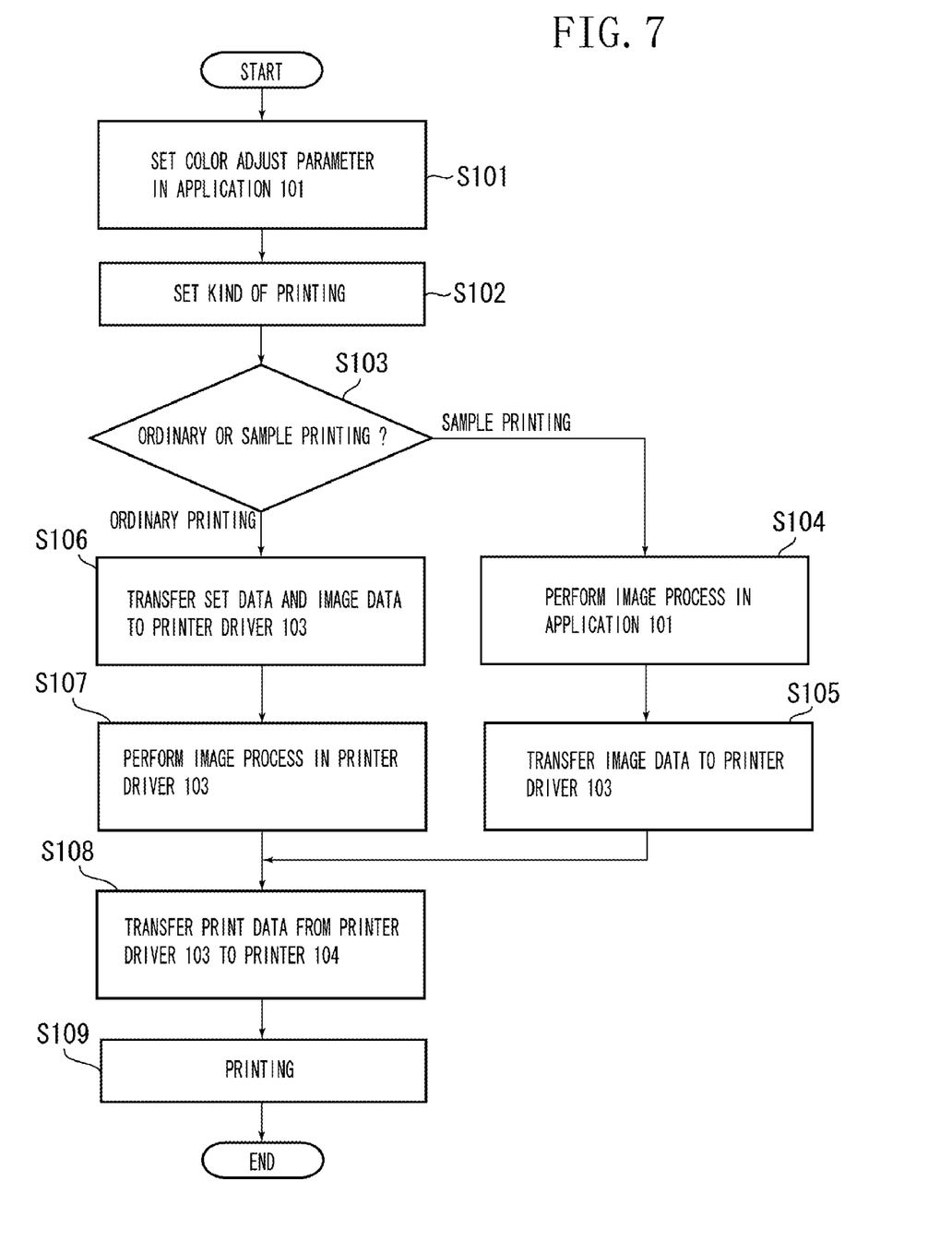
FIG. 7 is a flowchart for illustrating the flow of processing of image data and printing thereof according to an embodiment of the present invention.

The flow of performing image processing on image data and printing the data in this exemplary embodiment will be described with reference to a flowchart in FIG. 7. The image process in this exemplary embodiment is executed in the application 101 or in the printer driver 103.

Figure 2:
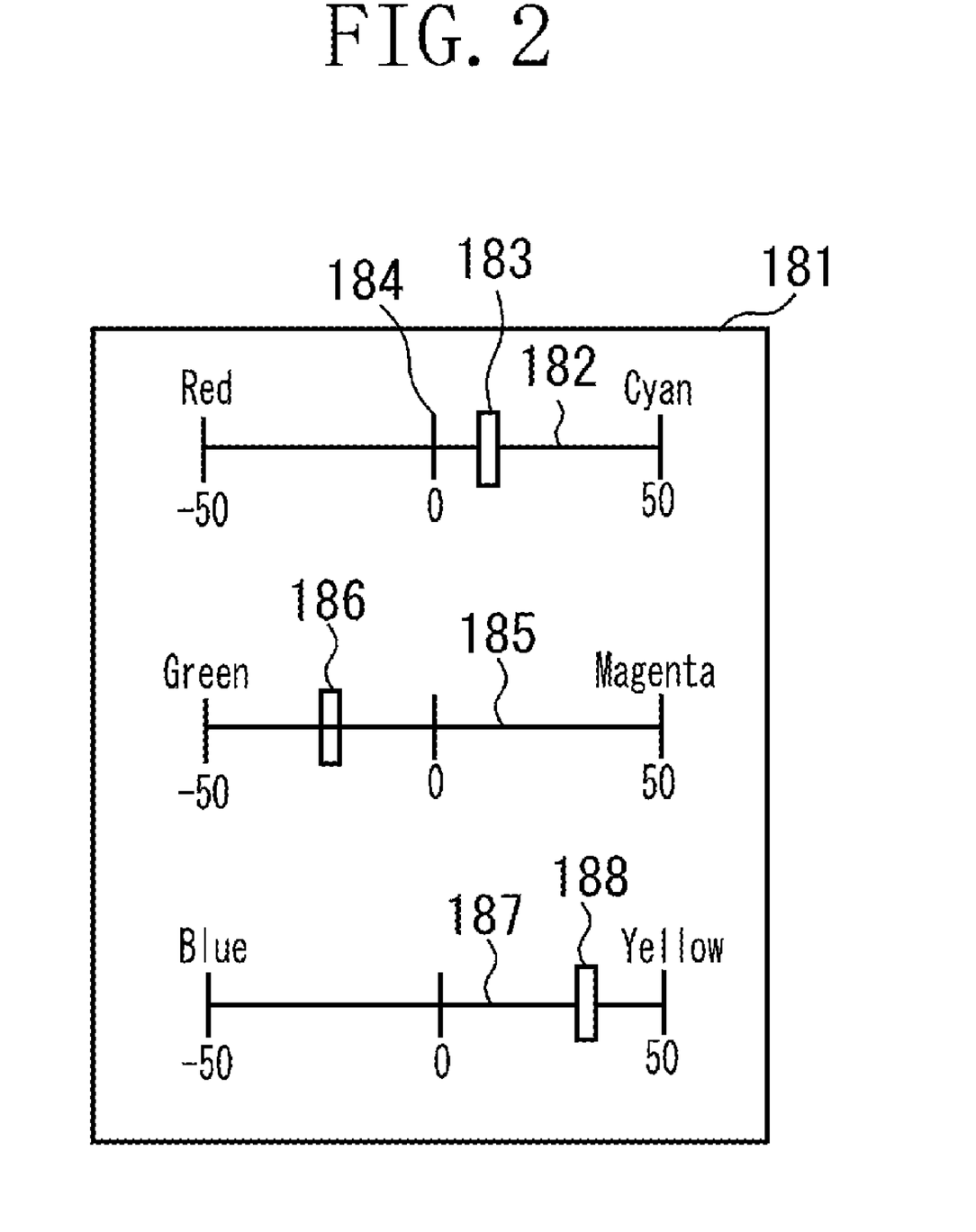
FIG. 2 is a diagram showing a user interface (UI) through which to set color adjustment parameters.

In step S101, image data is opened by the application 101, and image process parameters (color adjustment parameters) are set from the user interface shown in FIG. 2. Color adjustment parameters include parameters for adjusting color balance, brightness, and contrast. Furthermore, parameters for a sharpness process and backlight correction can be set (not shown).

FIG. 2 shows the user interface for setting color adjustment parameters at RGB signal levels. A setting screen 181 is shown on the display of the monitor 111. A slide bar 182 is used to adjust the levels of red and cyan. The user uses a pointing device, such as a mouse, to move a button 183 to left and right on the slide bar 182. The position 184 is where the button 183 is placed in its initial state, in other words, in a state that adjustment is not made. In the case of FIG. 2, the more the button 183 is moved to the left, the stronger the red component becomes, and the more the button 183 is moved to the right, the stronger cyan component becomes. Similarly, the slide bar 185 and the button 186 are used to adjust green and magenta, respectively. The slide bar 187 and the button 188 are used to adjust blue and yellow.

In step S102, by designating a print menu in a file menu of the application 101, the user interface of the printer driver 103 is started up. In the user interface, a type of sheet to be printed, the kind of printing (normal printing and sample printing), and the number of print copies are designated.

Figure 3:
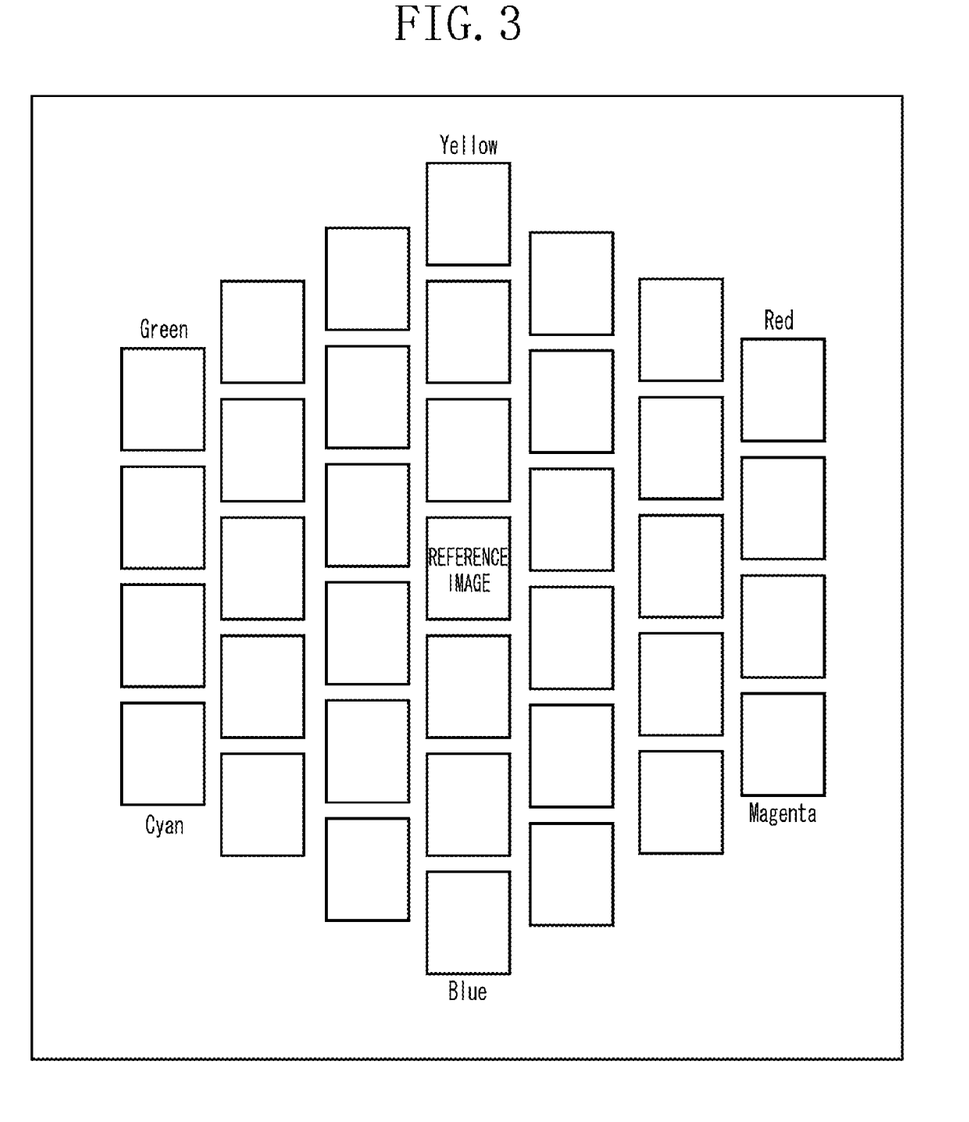
FIG. 3 is a diagram showing sample printing for color adjustment.

FIG. 3 shows a diagram showing sample printing. For those skilled in color adjustment, it is easy to set a plurality of color adjustment parameters simultaneously, but for ordinary users, it is extremely difficult to set a number of color adjustment parameters simultaneously. Therefore, it is generally known to perform sample printing as shown in FIG. 3 so as to enable users to easily set desired color tones. Sample printing is a function of classifying different color adjustment parameters into multiple stages, performing different image processes on a base image (reference image) used as a reference, and printing a plurality of obtained images arranged as indexes. In addition, sample printing arranges in parallel images of smaller sizes than in normal printing. This enables the user to recognize degrees of image processing at a glance, select images of desired color tones by referring to the printed sample images, and set color adjustment parameters.

In step S103, in the case of sample printing, the process proceeds to step S104, a layout of sample printing is created by image processing in the application 101 based on color adjustment parameters set in step S101. In step S105, image data subjected to image processing in the application 101 is transferred through step S102 to the printer driver 103, and print data is generated by the printer driver 103.

If the decision made in step S103 is normal printing, the process proceeds to step S106, and image data and setting values of color adjustment set in step S101 are transferred to the printer driver 103. In step S107, image data is subjected to image processing in the printer driver 103 based on the setting values, and print data is generated by the printer driver 103. In step S108, generated print data is transferred from the printer driver 103 to the printer 104, and in step S109, printing is performed.

Meanwhile, in each of the application 101 and the printer driver 103, the bit accuracy in performing image processing on image data can be varied arbitrarily. For example, when image data of a digital still camera captured with an 8-bit accuracy, is subjected to image processing by the application 101, the image process can be executed either without changing the 8-bit accuracy, or with the bit accuracy raised to 16 bits.

Figure 4:
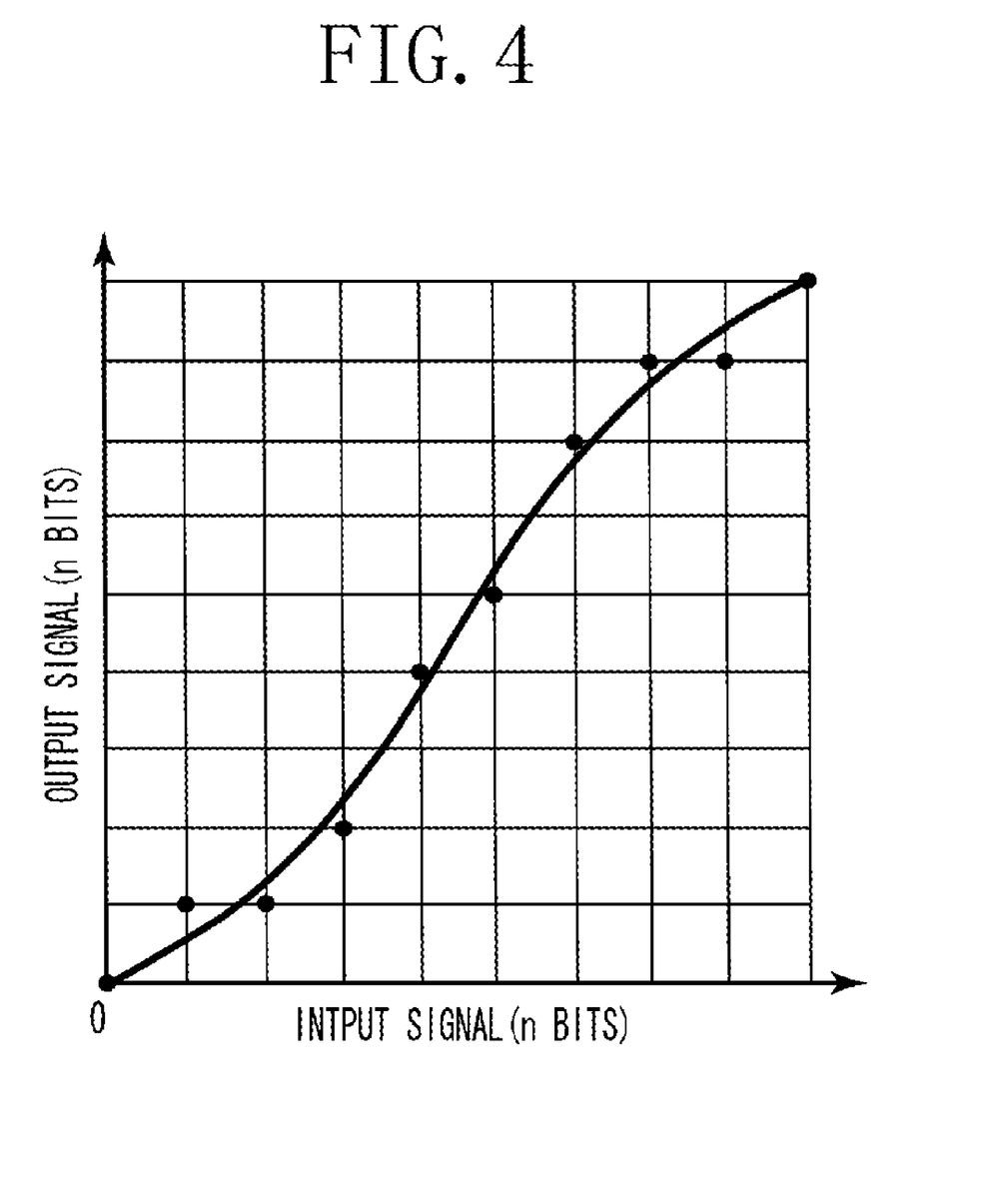
FIG. 4 is a diagram showing a tone curve when an input signal and an output signal each has the same number of bits.
Figure 5:
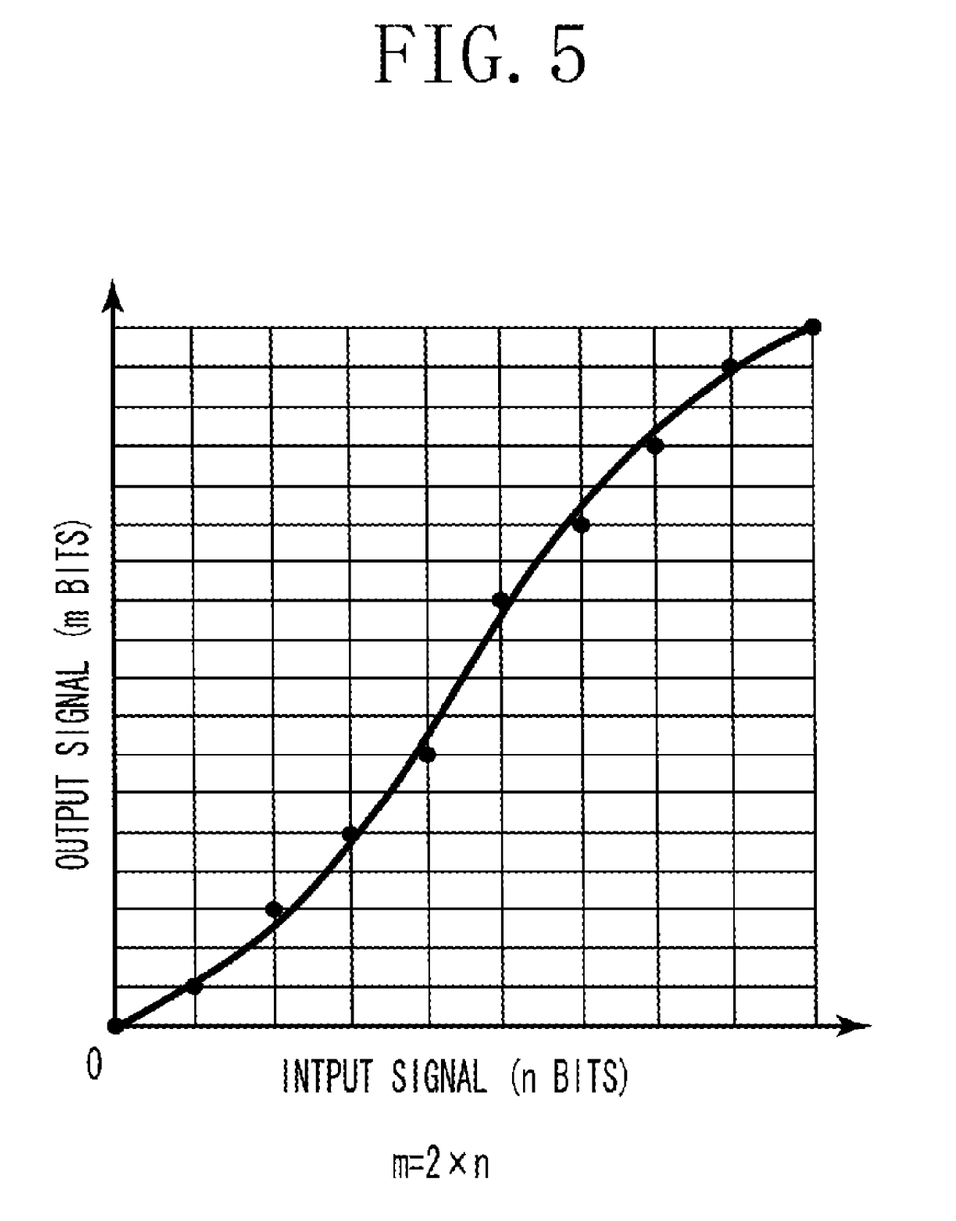
FIG. 5 is a tone curve when the number of bits of an output signal is twice as large as the number of bits of an input signal.

As a method of raising the bit number of an image, correction of a tone curve will be considered. When a tone curve has a non-linear line as shown in FIGS. 4 and 5, if a bit accuracy of an output signal is higher than a bit accuracy of an input signal, gray scales can be reproduced with high accuracy. FIGS. 4 and 5 show examples, in which an output signal in FIG. 4 is supposed to have a bit number n, an output signal in FIG. 5 is supposed to have a bit number m, which is twice as large as n. The black dots in those figures denote output signal values. The spaces between output signal values (black dots) are narrower in FIG. 5 than in those in FIG. 4, and therefore the dots are arranged in a line which is much closer to the tone curve. More specifically, the higher the bit accuracy of output signals, the higher the accuracy with which calculation results of the tone curve can be reflected in the output signal values. Raising the bit accuracy of output signals in image processing is an effective way to perform printing which places emphasis on gradation.

A specific process of switching process sections based on kinds of printing in this exemplary embodiment will be described with reference to FIG. 6.

Figure 6:
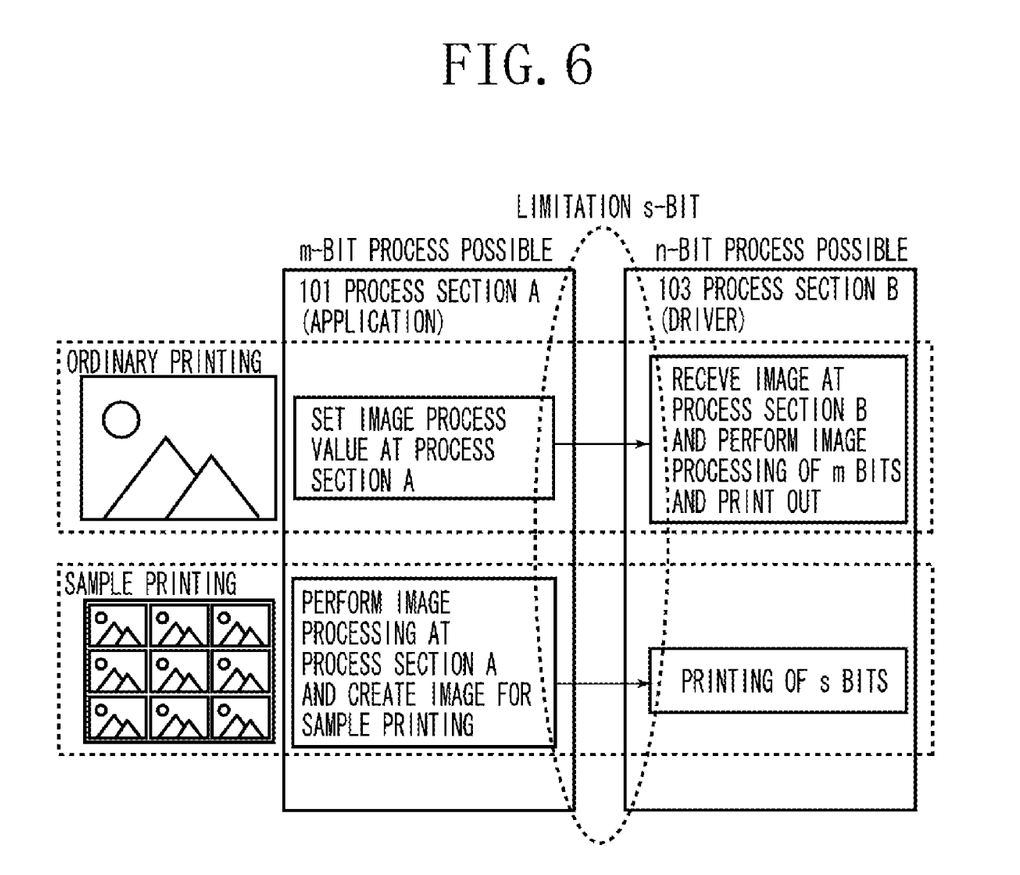
FIG. 6 is a diagram showing the flow of changing process sections where images processed.

In FIG. 6, the process section A of the application 101 can process data of bit number m, and the process section B of the printer driver 103 can process data of bit number n. Because there is a restriction on bit accuracy in data transfer between the application 101 and the printer driver 103, it is necessary to transfer image data in block size of s bits. Therefore, when the image data is processed which is larger than a restrictive number of bits (s bits), it is necessary to perform the image process in the process section B which is free of such restriction.

A flow is described in which an optional image is opened by the application 101, image processing such as color adjustment, is performed, and then the data is transferred from the printer driver 103 to the printer 104 that prints images.

In normal printing in which optional image data is subjected to image processing and a printed image is produced which places emphasis on gradation, in order to obtain high gradation quality, the bit accuracy of image data is important. Also when a plurality of images are output in parallel, if one wishes to perform printing which emphasizes gradation quality, an image process should preferably be executed in the printer driver 103.

There is a restriction on bit accuracy (s bits) of the drawing interface of OS 102, between the application 101 and the printer driver 103. Therefore, in order to perform an image process on image data of bit number n which provides higher accuracy than s bits (n>s), the image process is executed in the process section B of the printer driver. Then, the image data of bit number n is printed. However, because the image is opened in the application 101, the user sets image process values (color adjustment values) in the user interface of the application 101. In other words, in this case, the image process values set in the application 101 and reference image data that is not yet subjected to the image process, are transferred in block size of s bits through the drawing interface of OS 102 to the printer driver 103. Then, using a tone curve shown in FIG. 5 in the process section B of the printer driver 103, image data of bit number s is converted into image data of bit number n. The image data of bit number n is subjected to the image process based on the color adjustment parameters which have been received. The color adjustment includes color balance adjustment, brightness adjustment, and contrast adjustment. Alternatively, tone curves can be selected based on selected colors, and color adjustment using selected tone curves and bit conversion can be carried out simultaneously.

Next, in the sample printing, device-independent processes are not included in the process section B, and accordingly, image processes and layout generation necessary for the sample printing are all performed in the process section A. When a user selects the sample printing in the application 101, different image processes of multiple stages are executed on image data. A plurality of processed images are arranged and synthesized in a layout of sample printing as shown in FIG. 3. Though the process section A can perform image processing with an accuracy of m bits, the drawing interface of OS 102 has a restrictive bit number of s bits, therefore, an image process in the process section A can be performed with an accuracy of s bits. By performing an image process with a reduced bit number (from m bits to s bits), a process load can be decreased. A sample-printed image thus created is transferred with a bit number s bits through the drawing interface of the OS 102 to the process section B, and a printed image of a bit number s is output.

In this exemplary embodiment, sample printing has been described. However, besides sample printing, also in the case of simple printing which is performed only for the purpose of checking a general color tone such as proof printing, image processing can be performed in the process section A of the application 101 to generate a print image, and a printed image of a bit number s can be produced. Also, with respect to images which do not originally place emphasis on gradation, such as image data regarding index colors or data that can be classified as documents, there is no need to secure a high bit accuracy. Accordingly, such image processing can be performed in the process section A of the application 101, and a printed image of a bit number s can be output.

The bit number m of image data that is processed in the application 101 can be 16 bits, the bit number n of image data that is processed in the printer driver 103 can be 16 bits, and the restrictive bit number s of the drawing interface of OS 102 can be 8 bits. Alternatively, the m and n can be 32 bits, and the s can be 16 bits. Even if the bit accuracy of the system is raised, the basic principle remains unchanged.

In this exemplary embodiment, the process section A is stored in the application 101 and the process section B is stored in the printer driver 103. However, if a plurality of application 101 is stored in OS 102, the above-described process can be performed between two pieces of application. More specifically, the process section A is stored in application A, the process section B is stored in application B, and data is transferred from the application A to the application B through the drawing interface of OS 102. In this case, if there is bit accuracy restriction between the two pieces of application 101, the process sections can be changed according to a kind of printing. Similarly, with respect to the printer drivers 103, in a case where data is transferred between the printer drivers 103, if there is bit restriction between the printer drivers 103, the process sections can be changed according to a kind of printing.

In recent years, direct print is in widespread public use, in which an image captured by a digital still camera 106 is printed out in the printer 104 by directly connecting the camera to the printer. In such a case, a process section is provided both in the digital still camera 106 and in the printer 104. The process section A is stored in the digital still camera 106 and the process section B is stored in the printer 104. When there is restriction on bit accuracy of image data at the connection point between the digital still camera 106 and the printer 104, as described above, image processing for sample printing can be performed in the digital still camera 106, and image processing for normal printing can be performed in the printer 104. In other words, the restriction on bit accuracy between the process section A and the process section B is not limited to the drawing interface of OS 102, but can also be applied to any parts that have a connecting function between two process sections no matter what form they take.

Besides, when the OS 102 has a function like the application 101 or the printer driver 103, image processing can be executed in the OS 102. In this case, if the process section that performs image processing is subject to the restriction of the bit accuracy of the drawing interface, this invention can be employed.

In this exemplary embodiment, under a condition that the bit accuracy of the application 101 and the bit accuracy of the printer driver 103 are determined, change of the image process sections is previously set. Meanwhile, if there are a plurality of process sections in the system 100, before an image process is executed, among a plurality of process sections, a process section having the highest accuracy can be selected automatically or manually, and the image process can be executed in a selected process section. Alternatively, by detecting restriction on the bit accuracy of the drawing interface of OS 102, image processing can be performed in a process section with a minimum process load, among the plurality of process sections.

As described above, if there is restriction on bit accuracy in the drawing interface of OS between the process sections, it is possible to change the image process sections, according to the purpose, usage, and kind of printing. For example, when the printer driver can perform image processing with an accuracy equal to or higher than the bit number of the drawing interface of OS, the printer driver performs image processing. Thus, it is possible to produce a printed image with high gradation quality without being restricted by the bit number of the drawing interface. Particularly, when a tone curve is corrected using a non-linear line, the method of this exemplary embodiment is useful that can perform image processing with accuracy equal to or higher than the bit number of OS.

On the other hand, when images of small size as in sample printing do not require a bit accuracy of image processing, image processing is performed by a device-independent application. In a system including a plurality of printers, image processes common to different printers are executed by the application, so that the printer drivers can be reduced in size and weight, and the capacity of the whole system can be decreased.

Second Exemplary Embodiment

In the first exemplary embodiment, color printing has been described. In the second exemplary embodiment, a case of monochrome printing will be described. The flow of the whole process is as shown in the flowchart of FIG. 7, and the process similar to the first exemplary embodiment is performed. When sample printing is selected, image processing is executed in the application 101. When normal printing in monochrome mode is selected, image processing is executed in the printer driver 103. The monochrome mode is selected by the application 101 before printing is started.

The problem with the monochrome mode is that the number of gray scales becomes smaller than in the color mode. If an image signal value is 8 bits, color reproduction of 256 cubed=about 16,700,000 colors is possible since RGB signals each have 256 gray scales in the color mode. On the other hand, in the monochrome mode, because the signal value of all pixels are the same for R, G, and B, only 256 gray scales can exist. In other words, in the monochrome mode, even if the image signal value is 8 bits, the number of gray scales is far lower than in the color mode. Therefore, to increase the number of gray scales in a printed image in the monochrome mode, it is necessary to raise the bit accuracy and perform image processing in a process section that can keep the bit accuracy to produce a printed image.

Therefore, when a color image is converted into a monochrome image and a monochrome print is produced, for example, it is necessary to raise the bit number of an output image when converting the color image to a monochrome image. Conversion from the color image into the monochrome image is performed by the printer driver in normal printing or by the application in sample printing.

An equation for converting a color image (R, G, and B values) into a monochrome image (R', G', and B' values) is shown below using a luminance value Y.

$$Y = 0.299 * R + 0.587 * G + 0.114 * B \quad (1)$$

$$R' = Y \quad (2)$$

$$G' = Y \quad (3)$$

$$B' = Y \quad (4)$$

In Eq.(1), if a luminance value Y can only take an 8-bit integer value (in a range of 0 to 255), the accuracy at decimal places is lost. If the bit number of the luminance value Y is increased to 9 bits and the decimal portion is adopted in calculation, the gray scales twice as large as in the case of 8 bits can be reproduced. Further, by increasing the bit number to 16 bits, the gray scales of 65536 colors can be reproduced. In the monochrome mode, the number of colors that can be reproduced, is originally fewer than in the color mode. Accordingly, by increasing the bit accuracy, the accuracy at decimal places can be realized, in other words, a printed image with high gradation quality can be produced.

As described above, in monochrome printing, when there is restriction on the bit accuracy of the drawing interface of OS between the process sections, the image process sections can be changed according to the purpose, usage, and kind of printing. When the printer driver can perform image processing with accuracy equal to or higher than the bit number of the drawing interface of OS, for example, the printer driver performs the image processing. Thus, printing with high gradation quality can be performed without being restricted by the bit number of the drawing interface. The method of this exemplary embodiment that can perform image processing with accuracy equal to or higher than the bit number of OS is useful especially when a tone curve is corrected using a non-linear line. In printing which does not require a high accuracy, such as sample printing, image processing can be performed in the application, and shared in the system.

Another Exemplary Embodiment

As described above, the present invention can be applied to a system including a plurality of devices (such as a host computer, an interface unit, a reader, and a printer) or to a single device (such as a copying machine, a facsimile)

The program code of software for realizing the functions of the foregoing embodiments can be supplied to the computer of an apparatus or a system connected to various devices. To operate the various devices based on the program stored in the computer (the CPU or MPU) in the apparatus or the system, falls within the scope of the present invention.

In this case, the program code of the above-mentioned software realizes the functions of the afore-mentioned embodiments. The program code itself, and means for supplying the computer with the program code, such as a storage medium which stores the program code, constitute the present invention.

As the storage medium which stores the program code, a floppy disk®, hard disk, optical disk, magnetic optical disk, CD-ROM, magnetic tape, non-volatile memory card or ROM can be used.

The functions of the above-described embodiments are realized not only when the computer executes the supplied program code but also OS on which the program code runs in the computer is included in this exemplary embodiment. Or, also when the functions of the above-described embodiments are realized in collaboration with another application software, the program code constitutes the exemplary embodiment of the present invention.

Further, the supplied program code is stored in the memory provided on a function expansion board of the computer or a function expansion unit connected to the computer. If, based on commands from the program code, the CPU or the like provided on the function expansion board or in the function expansion unit executes part of or all of the actual process, in which the functions of the afore-described embodiments are realized, this technique is included in the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-377822 filed Dec. 28, 2005, which is hereby incorporated by reference herein in its entirety.

What is claimed is:

1. An apparatus having a first process section for executing a first image process on image data and a second process section for executing a second image process on image data, wherein the first process section performs the first image process on image data, image data of bit number s is transferred from the first process section to the second process section, and the second process section performs the second image process of converting image data of bit number s into image data of bit number n (n>s), the apparatus comprising:
a first process unit configured to cause the first process section to execute the first image process when a first kind of printing is selected;
a second process unit configured to cause the second process section to perform the second image process when a monochrome mode and a second kind of printing are selected.

2. The apparatus according to claim 1, wherein the first process section is an application and the second process section is a printer driver.

3. The apparatus according to claim 1, wherein the first kind of printing is sample printing and the second kind of printing is printing which places emphasis on gradation.

4. The apparatus according to claim 1, wherein the first image process is a layout creating process in sample printing.

5. The apparatus according to claim 1, wherein an image to be printed in the first kind of printing is smaller in image size than an image to be printed in the second kind of printing.

6. The apparatus according to claim 1, wherein restriction on a bit number of image data that occurs when image data is transferred from the first process section to the second process section, is restriction by a drawing interface of an operating system.

7. The apparatus according to claim 1, wherein restriction on a bit number of image data that occurs when image data is transferred from the first process section to the second process section, is restriction by a connecting point between a digital still camera and a printer.

8. The apparatus according to claim 1, wherein the second image process further includes at least one of color balance adjustment, brightness adjustment, and contrast adjustment.

9. An apparatus having a first process section for executing a first image process on image data and a second process section for executing a second image process on image data, wherein the first process section performs the first image process on image data, image data of bit number s is transferred from the first process section to the second process section, and the second process section performs the second image process of converting image data of bit number s into image data of bit number n (n>s), the apparatus comprising:
a first process unit configured to cause the first process section to execute the first image process when a first kind of printing is selected;
a second process unit configured to cause the second process section to perform the second image process when a second kind of printing is selected.

10. The apparatus according to claim 9, wherein the first process section is an application and the second process section is a printer driver.

11. The apparatus according to claim 9, wherein the first kind of printing is sample printing and the second kind of printing is printing which places emphasis on gradation.

12. A system comprising:
a first unit configured to execute a first image process on image data;
a second unit configured to execute a second image process on image data, wherein the first process section performs the first image process on image data, image data of bit number s is transferred from the first process section to the second process section, and the second process section performs the second image process of converting image data of bit number s into image data of bit number n (n>s); and
an apparatus coupled to the first unit and the second unit, the apparatus configured to cause the first unit to execute the first image process when a first kind of printing is selected, and the apparatus configured to cause the second unit to perform the second image process when a monochrome mode and a second kind of printing are selected.

13. The system according to claim 12, wherein the first unit is a digital still camera and the second unit is a printer.

14. A method, wherein a first process section performs a first image process, image data of bit number s is transferred from the first process section to a second process section, and the second process section performs a second image process of converting image data of bit number s into image data of bit number n (n>s), the method comprising:
causing the first process section to perform the first image process when the first kind of printing is selected; and
causing the second process section to perform the second image process when a monochrome mode and the second kind of printing are selected.

15. The method according to claim 14, wherein the first process section is an application and the second process section is a printer driver.

16. The method according to claim 14, wherein the first kind is sample printing and the second kind of printing is printing which places emphasis on gradation.

17. The method according to claim 14, wherein an image to be printed in the first kind of printing is smaller in image size than an image to be printed in the second kind of printing.

18. The method according to claim 14, wherein the first image process is a layout creating process in sample printing.

19. The method according to claim 14, wherein restriction on a bit number of image data that occurs when image data is transferred from the first process section to the second process section, is restriction by a drawing interface of an operating system.

20. The method according to claim 14, wherein restriction on a bit number of image data that occurs when image data is transferred from the first process section to the second process section, is restriction by a connecting point between a digital still camera and a printer.

21. The method according to claim 14, wherein the second image process further includes at least one of color balance adjustment, brightness adjustment, and contrast adjustment.

22. A method, wherein a first process section performs a first image process, image data of bit number s is transferred from the first process section to a second process section, and the second process section performs a second image process of converting image data of bit number s into image data of bit number n (n>s), the method comprising:
causing the first process section to perform the first image process when the first kind of printing is selected; and
causing the second process section to perform the second image process when the second kind of printing is selected.

23. A storage medium storing instructions which, when executed by an apparatus having a first process section for executing a first image process on image data and a second process section for executing a second image process on image data, wherein the first process section performs the first image process on image data, image data of bit number s is transferred from the first process section to the second process section, and the second process section performs the second image process of converting image data of bit number s into image data of bit number n (n>s), causes the apparatus to perform operations comprising:
causing the first process section to perform the first image process when the first kind of printing is selected; and
causing the second process section to perform the second image process when a monochrome mode and the second kind of printing are selected.

* * * * *